US008390693B2

(12) United States Patent
Yoneyama

(10) Patent No.: US 8,390,693 B2
(45) Date of Patent: Mar. 5, 2013

(54) IMAGE PROCESSING APPARATUS

(75) Inventor: Yoshitaka Yoneyama, Daito (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 306 days.

(21) Appl. No.: 12/504,032

(22) Filed: Jul. 16, 2009

(65) Prior Publication Data

US 2010/0026851 A1 Feb. 4, 2010

(30) Foreign Application Priority Data

Aug. 1, 2008 (JP) ................................ 2008-199389

(51) Int. Cl.
*H04N 5/228* (2006.01)
*H04N 5/235* (2006.01)
*H04N 9/73* (2006.01)
*G06K 9/38* (2006.01)
*G06K 9/00* (2006.01)
*G06K 9/46* (2006.01)

(52) U.S. Cl. ............... 348/222.1; 348/221.1; 348/223.1; 348/365; 382/274; 382/162; 382/167; 382/118; 382/190

(58) Field of Classification Search ............... 348/222.1, 348/353, 229.1, 221.1, 223.1, 208.12, 673, 348/687, 678, 603, 362–366, 254, 252; 382/274, 382/118, 190, 181, 115, 167–172, 162, 242, 382/266, 254; 358/2.1, 3.15, 3.27, 520
See application file for complete search history.

(56) References Cited

U.S. PATENT DOCUMENTS

| | | | |
|---|---|---|---|
| 5,715,377 A | 2/1998 | Fukushima et al. | |
| 5,940,530 A | 8/1999 | Fukushima et al. | |
| 7,394,931 B2* | 7/2008 | Shimizu | 382/168 |
| 2003/0071908 A1* | 4/2003 | Sannoh et al. | 348/345 |

(Continued)

FOREIGN PATENT DOCUMENTS

| CN | 1463534 A | 12/2003 |
|---|---|---|
| CN | 1623164 A | 6/2005 |

(Continued)

OTHER PUBLICATIONS

Japanese Office Action issued Jul. 17, 2012 in corresponding Japanese Patent Application 2008-199389. English Translation.

(Continued)

*Primary Examiner* — Lin Ye
*Assistant Examiner* — Marly Camargo
(74) *Attorney, Agent, or Firm* — Westerman, Hattori, Daniels & Adrian, LLP

(57) ABSTRACT

An image processing apparatus includes first and second standard-deviation calculating circuits for calculating deviations σ1 and σ2 indicating a luminance bias of each pixel forming an input image. The deviation σ1 is calculated by referring to an average luminance of first block images forming the input image, and the deviation σ2 is calculated by referring to an average luminance of second block images forming the input image. A first correction-coefficient calculating circuit adjusts a correction coefficient K1 based on the deviation σ1, and a second correction-coefficient calculating circuit adjusts a correction coefficient K2 based on the deviation σ2. A Y correcting circuit corrects the luminance of each pixel forming the input image by referring to the correction coefficients K1 and K2. A CPU determines an input-image-attribute including presence/absence of a face image of a person so as to change adjustment characteristics of the correction coefficients K1 and K2.

7 Claims, 16 Drawing Sheets

U.S. PATENT DOCUMENTS

| | | | |
|---|---|---|---|
| 2004/0001165 A1 | 1/2004 | Shiota et al. | |
| 2004/0184673 A1* | 9/2004 | Watanabe | 382/274 |
| 2005/0129333 A1 | 6/2005 | Matsuyama et al. | |
| 2005/0243349 A1 | 11/2005 | Aoyama | |
| 2007/0041657 A1* | 2/2007 | Rychagov et al. | 382/274 |
| 2008/0007634 A1 | 1/2008 | Nonaka et al. | |
| 2008/0043120 A1 | 2/2008 | Mitsunaga | |
| 2009/0097775 A1* | 4/2009 | Monobe et al. | 382/268 |

FOREIGN PATENT DOCUMENTS

| | | |
|---|---|---|
| CN | 101090458 A | 12/2007 |
| JP | 5-110936 A | 4/1993 |
| JP | 08-062741 A | 3/1996 |
| JP | 2000-188768 A | 7/2000 |
| JP | 2003-092699 A | 3/2003 |
| JP | 2003-259154 A | 9/2003 |
| JP | 2005-311484 A | 11/2005 |
| JP | 2006-018465 A | 1/2006 |
| JP | 2006-026183 A | 2/2006 |
| JP | 2006-033520 A | 2/2006 |
| JP | 2008-035480 A | 2/2008 |

OTHER PUBLICATIONS

Chinese Office Action dated Dec. 14, 2012, issued in corresponding Chinese Patent Application No. 200910173324.4, with English translation (8 pages).

* cited by examiner (A) LARGE SIZE     (B) MIDDLE SIZE     (C) SMALL SIZE

TBL

| No. | POSITION | SIZE |
|---|---|---|
| 1 | | |
| 2 | | |
| 3 | | |
| ⋮ | ⋮ | ⋮ |

(A)

(B)

PIX_G=2.0−ΔAVE*K1−((AVEfrm*K2), PIX_UDR, PIX_OVR)+GAIN_OFST
ATTENTION: ΔAVE=AVEblk−AVEfrm

LUMINANCE
DETECTION BLOCK (A) CHARACTERISTIC OF Y DATA

L_A1: NONE OF FACES AND AVEfrm > REF1
L_B1: SOME OF FACES AND AVEfrm > REF1
L_C1: SOME OF FACES AND AVEfrm ≦ REF1
L_D1: NONE OF FACES AND AVEfrm ≦ REF1

(B) CHARACTERISTIC OF UV DATA

L_A2: NONE OF FACES AND AVEfrm > REF1
L_B2: SOME OF FACES AND AVEfrm > REF1
L_C2: SOME OF FACES AND AVEfrm ≦ REF1
L_D2: NONE OF FACES AND AVEfrm ≦ REF1

IMAGE PROCESSING APPARATUS

CROSS REFERENCE OF RELATED APPLICATION

The disclosure of Japanese Patent Application No. 2008-199389, which was filed on Aug. 1, 2008 is incorporated herein by reference.

BACKGROUND OF THE INVENTION

1. Field of the Invention

The present invention relates to an image processing apparatus. In particular, the present invention relates to an image processing apparatus for correcting each luminance of a plurality of pixels forming an input image by determining an input-image-attribute including presence of a predetermined feature image.

2. Description of the Related Art

According to one example of this type of image processing apparatus, a video signal based on output of an imaging element is outputted to outside, and also applied to a subject extracting circuit. The subject extracting circuit extracts a specific subject signal representing a specific subject, from the video signal. Further a control circuit adjusts settings of a signal processing circuit such as a gain of the video signal, a black level thereof, a frequency characteristic thereof, and a hue thereof, based on the extracted specific subject signal. Thereby, a portion of the specific subject and the other portions thereof may be processed separately, and thus, image quality control adaptive to the specific subject is realized.

However, in the above-described image processing apparatus, when the setting of the signal processing circuit is adjusted, a luminance of the video signal is not considered, and therefore, there is a lit to an adaptive image quality control operation.

SUMMARY OF THE INVENTION

An image processing apparatus according to the present invention, comprises: a bias degree calculator for calculating a bias degree of each luminance of a plurality of pixels forming an input image by referring to an average luminance of the input image; a luminance corrector for correcting each luminance of the plurality of pixels forming the input image based on the bias degree calculated by the bias degree calculator; and a fiat changer for changing a correction characteristic of the luminance corrector by determining an input-image-attribute including presence/absence of a predetermined feature image.

Preferably, the attribute noticed by the first changer for a determining process further includes the average luminance of the input image.

Preferably, further comprised are: a first average-luminance calculator for calculating a first average luminance equivalent to an average luminance of the input image for each first block having a first size; and a second average-luminance calculator for calculating a second average luminance equivalent to an average luminance of the input image for each second block having a second size larger than the first size, wherein the bias degree calculator includes: a first bias-degree calculator for calculating a first bias degree equivalent to a bias degree for the first average luminance; and a second bias-degree calculator for calculating a second bias degree equivalent to a bias degree for the second average luminance.

Preferably, the luminance corrector includes a first coefficient adjustor for adjusting a first correction coefficient based on the first bias degree, a second coefficient adjustor for adjusting a second correction coefficient based on the second bias degree, and an arithmetic processor for performing an arithmetic process on the first average luminance and the second average luminance by referring to the first correction coefficient and the second correction coefficient, and the first changer includes an adjustment characteristic changer for changing adjustment characteristics of the first coefficient adjustor and the second coefficient adjustor.

Preferably, the arithmetic processor includes a block bias degree calculator for calculating a block bias degree equivalent to a bias degree of the first average luminance for the second average luminance, and a weighter for weighting the block bias degree by referring to the first correction coefficient.

Preferably, the arithmetic processor further includes a subtracter for subtracting from a predetermined value a weighting result of the weighter, and the adjustment characteristic changer includes a first adjustment characteristic changer for changing an adjustment characteristic of the first coefficient adjustor so that a weighted amount by the weighter increases when the input image has the predetermined feature image.

Preferably, the luminance corrector includes an adder for adding an offset, and the first changer includes an offset changer for changing a magnitude of the offset.

More preferably, the luminance corrector further includes: a gamma-correction-amount outputter for outputting a gamma correction amount corresponding to each of the plurality of pixels forming the input image; and a modifier for modifying the gamma correction amount outputted by the gamma-correction-amount outputter by referring to an arithmetic operation result of an arithmetic processor.

An image processing apparatus according to the prevent invention comprises: a color corrector for correcting each color of the plurality of pixels forming the input image by referring to a luminance corrected by the luminance corrector; and a second changer for changing a correction characteristic of the color corrector in association with a change process of the first changer.

An image processing method executed by an image processing apparatus, the method comprises: a bias-degree calculating step of calculating a bias degree of each luminance of a plurality of pixels forming an input image by referring to an average luminance of the input image; a luminance correcting step of correcting each luminance of the plurality of pixels forming the input image based on the bias degree calculated in the bias-degree calculating step; and a changing step of changing a correction characteristic in the luminance correcting step by determining an input-image-attribute including presence/absence of a predetermined feature image.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
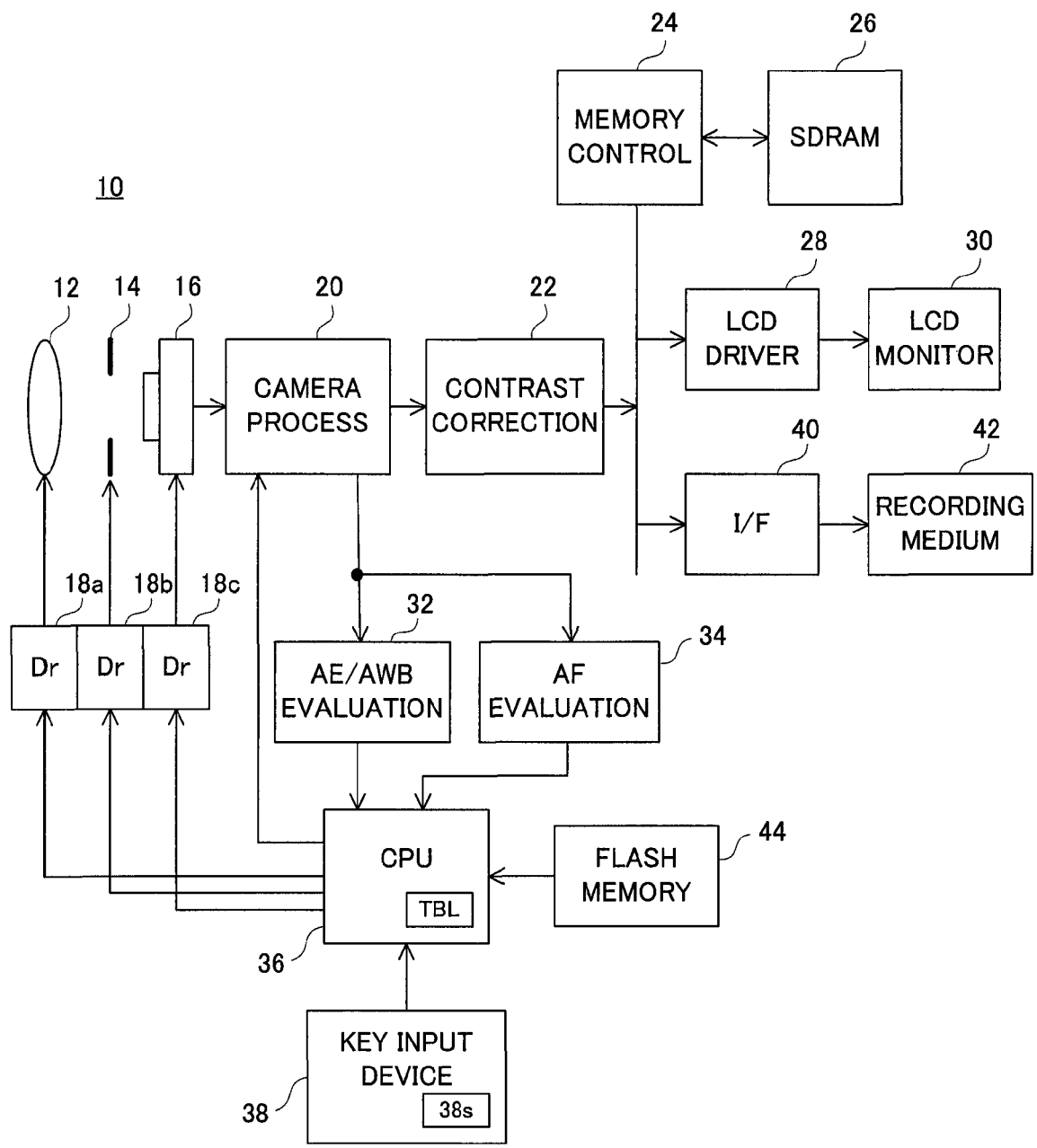
FIG. 1 is a block diagram showing a configuration of one embodiment of the present invention.

With reference to FIG. 1, a digital camera 10 according to this embodiment includes a focus lens 12 and an aperture unit 14 respectively driven by drivers 18a and 18b. An optical image of an object scene that undergoes these components is irradiated onto an imaging surface of an imaging device 16, and subjected to photoelectric conversion. Thereby, electric charges representing the object scene image are produced.

It is noted that the imaging surface is covered with a primary color filter not shown, and the electric charges produced by each of a plurality of pixels placed on the imaging surface have color information of any one of R Red), G (Green), and B (Blue).

When power is inputted, a CPU 36 instructs a driver 18c to repeat exposure operations and thinning-out reading-out operations in order to execute a through image process under an imaging task. In response to a vertical synchronization signal Vsync periodically generated from an SG (Signal Generator) not shown, the driver 18c exposes the imaging surface and reads out one portion of the electric charges produced on the imaging surface in a raster scanning manner. From the imaging device 16, raw image data based on the read-out electric charges are periodically outputted.

A camera processing circuit 20 performs processes, such as a white balance adjustment, a color separation, and a YUV conversion, on the raw image data outputted from an imaging device 16, so as to produce image data of a YUV format. Contrast of the produced image data is corrected by a contrast correcting circuit 22, and image data having the corrected contrast is written in an SDRAM 26 through a memory control circuit 24. An LCD driver 28 repeatedly reads out the image data accommodated in the SDRAM 26 through the memory control circuit 24, and drives an LCD monitor 30 based on the readout image data. As a result, a real-time moving image (through image) of the object scene is displayed on a monitor screen.

Figure 2:
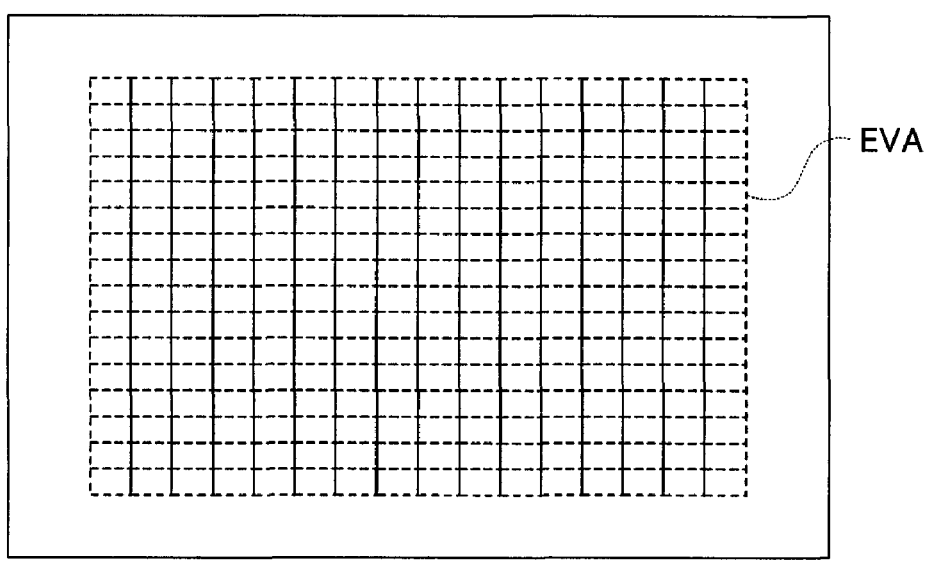
FIG. 2 is an illustrative view showing one example of an allocation state of an evaluation area in an imaging surface.

With reference to FIG. 2, an evaluation area EVA is allocated to a center of the imaging surface. The evaluation area EVA is divided into 16 portions in each of a horizontal direction and a vertical direction, and therefore, 256 divided areas form the evaluation area EVA.

An AE/AWB evaluating circuit 32 integrates Y data belonging to the evaluation area EVA, out of Y data outputted from the camera processing circuit 20, at each generation of the vertical synchronization signal Vsync. Thereby, 256 integral values, i.e., 256 AE/AWB evaluation values, are outputted from the AE/AWB evaluating circuit 32 in response to the vertical synchronization signal Vsync. Further, an AF evaluating circuit 34 integrates a high-frequency component of the Y data belonging to the same evaluation area EVA at each generation of the vertical synchronization signal Vsync. Thereby, 256 integral values, i.e., 256 AF evaluation values, are outputted from the AF evaluating circuit 34 in response to the vertical synchronization signal Vsync. Process operations based on the AE/AWB evaluation value or the AF evaluation value are described later.

Figure 3:
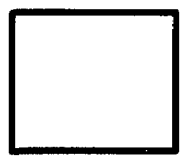
FIG. 3(A) is an illustrative view showing one example of a face-detection frame structure having a large size.
FIG. 3(B) is an illustrative view showing one example of a face-detection frame structure having a middle size.
FIG. 3(C) is an illustrative view showing one example of a face-detection frame structure having a small size.
Figure 3:
Figure 3:

The CPU 36 detects a face image of a person from the image data of each frame accommodated in the SDRAM 26, under a face detecting task that is concurrent with the imaging task. For the face detecting task, three face-detection frame structures different in size, as shown in FIG. 3(A) to FIG. 3(C), are prepared. Firstly, the face-detection frame structure of "large size" shown in FIG. 3(A) is set to an upper left of the evaluation area EVA, i.e., a face-detection stating position, shown in FIG. 2. Further, a face detection flag FLG for identifying whether or not the face image is detected is set to "0".

When the vertical synchronization signal Vsync is generated, partial image data corresponding to the face-detection frame structure, out of the image data of a current frame accommodated in the SDRAM 26, is subjected to a matching process for a face recognition. More specifically, it is determined whether or not a partial image within the face-detection frame structure is equivalent to the face image of a person, by referring to dictionary data, such as "eye", "nose", and "mouth" of a person, prepared in a flash memory 44. When the partial image to be noticed is determined as being equivalent to the face image, the face detection flag FLG is set to "1" and face-frame-structure information written with a position and a size of a face-detection frame structure at this time point is written on a face-frame-structure information table TBL shown in FIG. 4.

It is noted that the face detection flag FLG is returned to "0" at each generation of the vertical synchronization signal Vsync, and the face-frame-structure information table TBL is also cleared at each generation of the vertical synchronization signal Vsync.

Figures 4, 5:
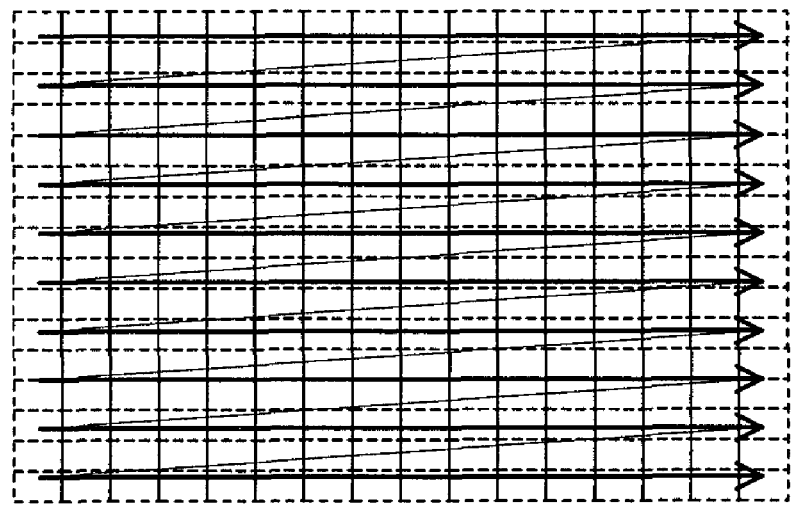
FIG. 4 is an illustrative view showing one example of a face-frame-structure information table applied to the embodiment in FIG. 1.
FIG. 5 is an illustrative view showing one portion of a face detection operation.

The face-detection frame structure is moved by a predetermined amount in a raster direction according to a procedure shown in FIG. 5, and the above-described matching process is executed at a plurality of positions on the evaluation area EVA. At each successful face recognition, the face-flame-structure information corresponding to the recognized face is written on the face-frame-structure information table TBL.

When the face-detection frame structure of "large size" reaches a lower right of the evaluation area EVA, i.e., a face-detection ending position, the size of the face-detection frame structure is updated to a "medium size", and the face-detection frame structure having the updated size is re-placed at the face-detection string position. Similar to the above-described case, the face-detection flame structure is moved in a raster direction on the evaluation area EVA, and the face-frame-structure information corresponding to the face recognized by the matching process is written on the face-frame-structure information table TBL. When the face-detection frame structure of "medium size" reaches the face-detection ending position, then, a face-detection flame structure of "small size" is placed at the face-detection starting position, and the moving process and the matching process similar to the above-described case are executed. The face-flame-structure information obtained thereby is also written on the face-frame-structure information table TBL.

Figure 6:
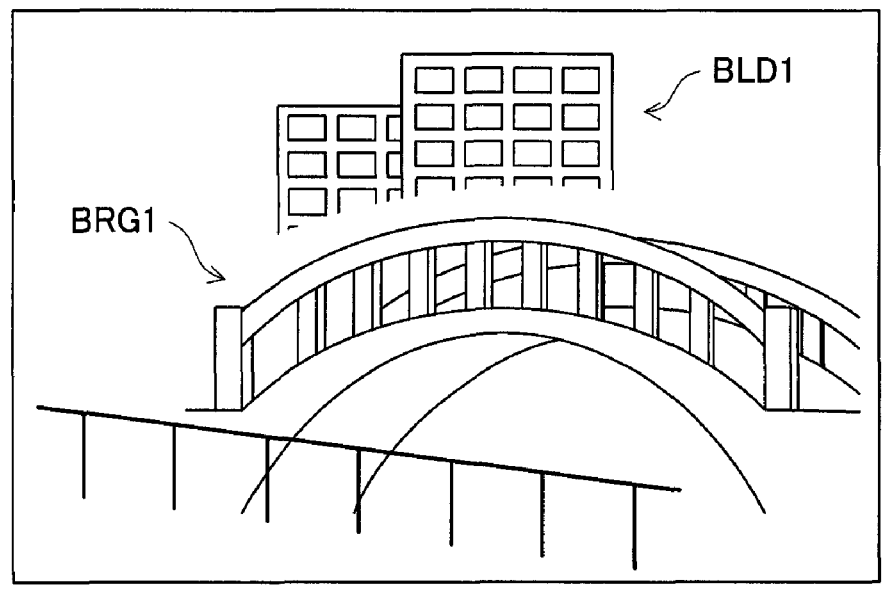
FIG. 6(A) is an illustrative view showing one example of an object scene captured by an imaging device.
FIG. 6(B) is an illustrative view showing another example of the object scene captured by the imaging device.
Figure 6:
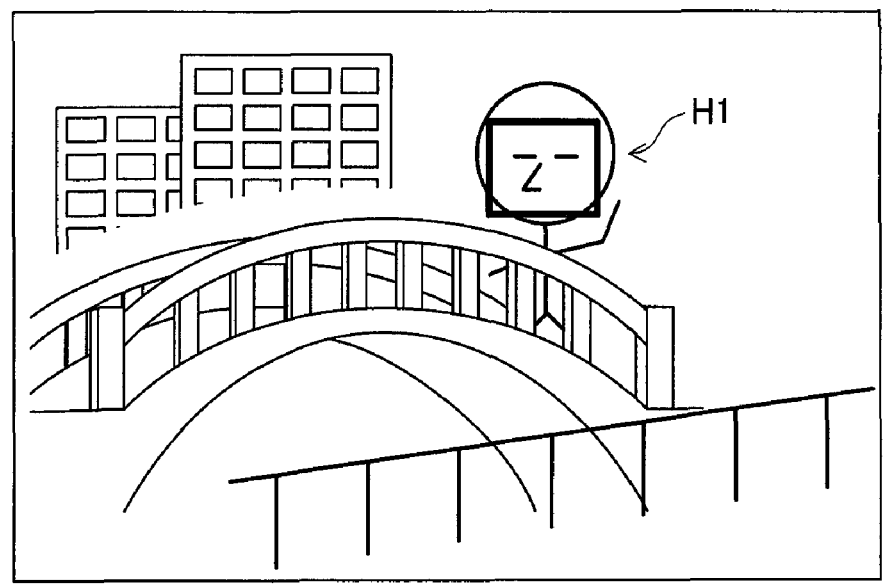

When photographing an object scene shown in FIG. 6(A), the face-flame-structure information is not written on the face-frame-structure information table TBL, and the face detection flag FLG maintains "0". On the other hand, when photographing an object scene shown in FIG. 6(B), a position and a size of a frame structure indicated by a bold line is written on the face-frame-structure information table TBL, and the face detection flag FLG is updated to "1".

Concurrently with the face detecting task, the CPU 36 executes a through image-use AE/AWB process based on the output of the AE/AWB evaluating circuit 32 under the imaging task. Herein, when at least one face frame structure is set on the face-frame-structure information table TBL, one portion of the divided areas covering the face frame structure is defined as an extraction area On the other hand, when no face frame structure is set on the face-frame-structure information table TBL, the entire evaluation area EVA is defined as the extraction area.

The through image-use AE/AWB process is executed based on the AE/AWB evaluation value belonging to the defined extraction area, and thereby, an appropriate EV value and an appropriate white-balance adjustment gain are calculated. An aperture amount and an exposure time that define the calculated appropriate EV value are set to the drivers 18b and 18c, respectively. Further, the calculated appropriate white-balance adjustment gain is set to the camera processing circuit 20. As a result, a brightness and a white balance of the through image displayed on the LCD monitor 30 are moderately adjusted.

When a shutter button 38s arranged in the key input device 38 is half-depressed, the CPU 36 stops the face detecting task and executes a recording-use AE/AWB process based on the output of the AE/AWB evaluating circuit 32 and an AF process based on the output of the AF evaluating circuit 34 under the imaging task.

The recording-use AE/AWB process is also executed based on the AE/AWB evaluation value belonging to the defined extraction area, and thereby, an optimal EV value and an optimal white-balance adjustment gain are calculated. Similar to the above-described case, an aperture amount and an exposure time that define the calculated optimal EV value are set to the drivers 18b and 18c, respectively, and the calculated optimal white-balance adjustment gain is set to the camera processing circuit 20. As a result, a through image having an optimal brightness and an optimal white balance is displayed on the LCD monitor 30.

The AF process is also executed based on the AF evaluation value belonging to the defined extraction area. The focus lens 12 is moved in an optical-axis direction by the driver 18a, and is placed at a focal point by a so-called hill-climbing process.

Upon completion of the AF process, the CPU 36 executes a contrast adjusting process under the imaging task. A contrast adjusting manner, which is described in detail later, differs depending on whether there exists the face image of a person in the object scene image (whether the face detection flag FLG is "1") and whether an average luminance of the object scene image exceeds a reference value REF1. As a result, a through image having a contrast depending upon an attribute of the object scene is outputted from the LCD monitor 30.

When the shutter button 38s is fully depressed, a recording process is executed under the imaging task. The CPU 36 commands the driver 18c to execute a main exposure operation and all-pixel reading-out, one time each. The driver 18c performs the main exposure on the imaging surface in response to the generation of the vertical synchronization signal Vsync, and reads out all the electric charges produced on the imaging surface in a raster scanning manner. As a result, high-resolution raw image data representing the object scene is outputted from the imaging device 16.

The outputted raw image data is subjected to the process similar to that described above, and as a result, high-resolution image data according to a YUV format is secured in the SDRAM 26. An I/F 40 reads out the high-resolution image data thus accommodated in the SDRAM 26 through the memory control circuit 24, and then, records the read-out image data on a recording medium 42 in a file format. It is noted that the through-image process and the face detecting task are resumed at a time point when the high-resolution image data is accommodated in the SDRAM 26.

Figure 7:
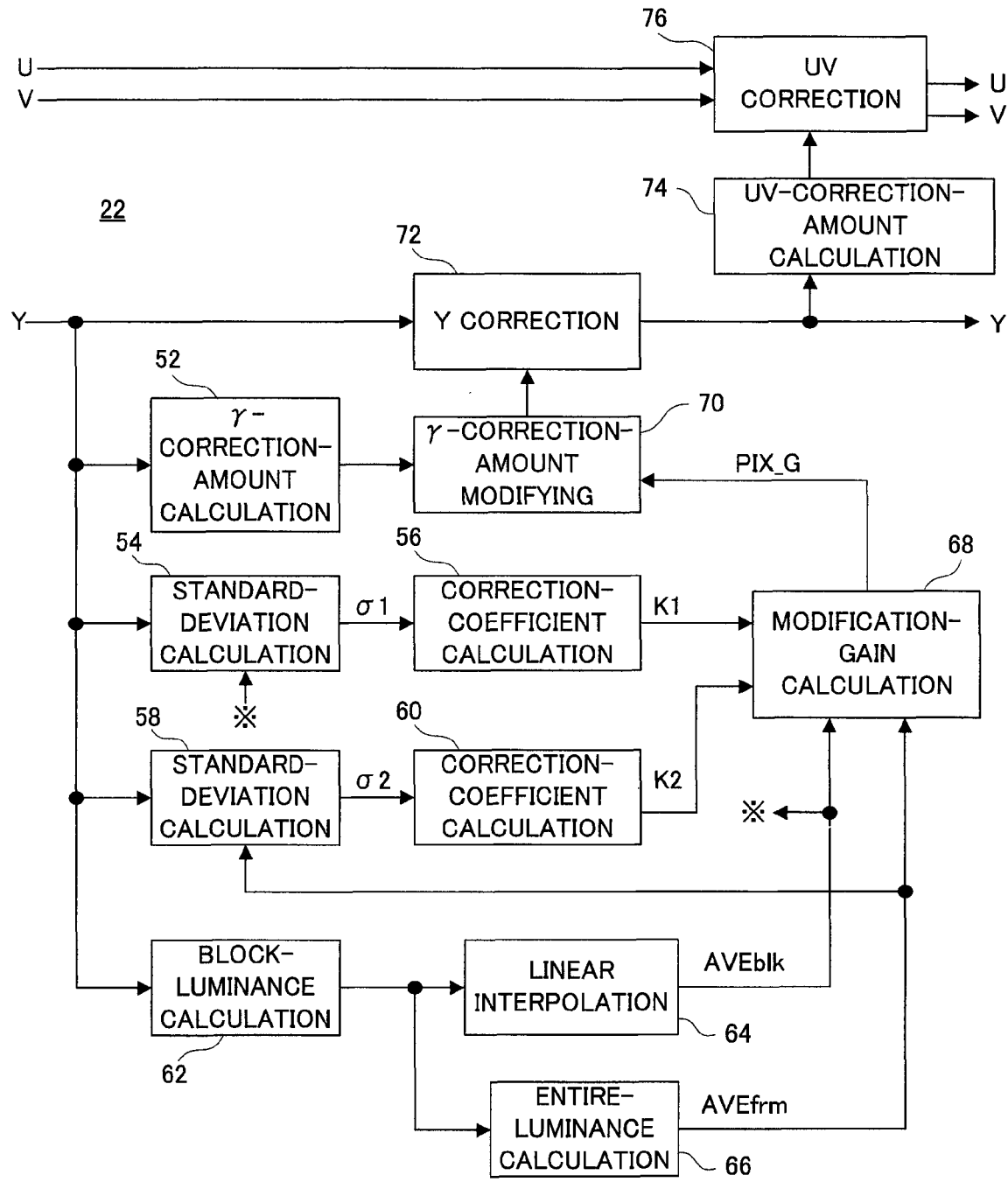
FIG. 7 is a block diagram showing one example of a configuration of a contrast correcting circuit applied to the embodiment in FIG. 1.

The contrast correcting circuit 22 is configured as shown in FIG. 7. The Y data forming the image data outputted from the camera processing circuit 20 is applied to a Y correcting circuit 72, a γ-correction-amount calculating circuit 52, standard-deviation calculating circuits 54 and 58, and a block-luminance calculating circuit 62. The U data and the V data forming the image data outputted from the camera processing circuit 20 are applied to a UV correcting circuit 76.

Figure 8:
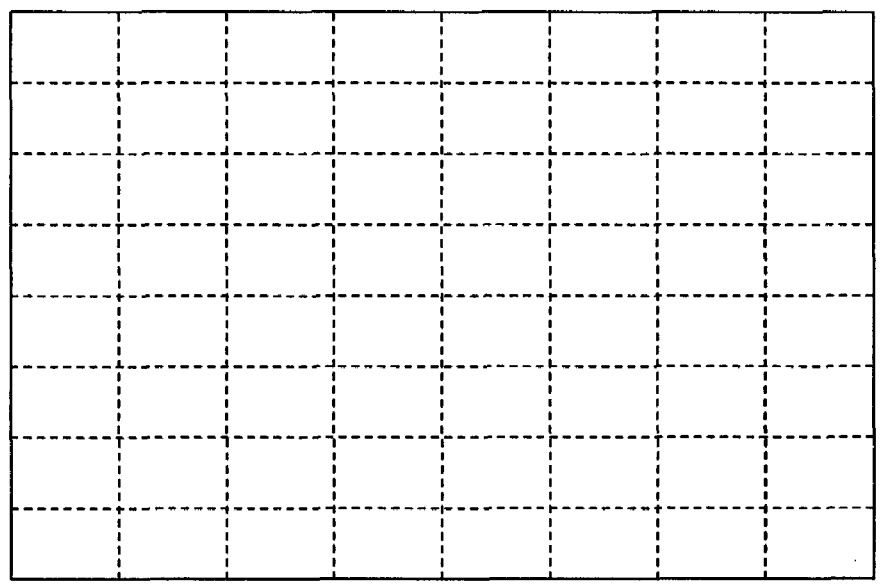
FIG. 8 is an illustrative view showing one portion of an operation of a block-luminance calculating circuit applied to the embodiment in FIG. 7.
Figure 9:
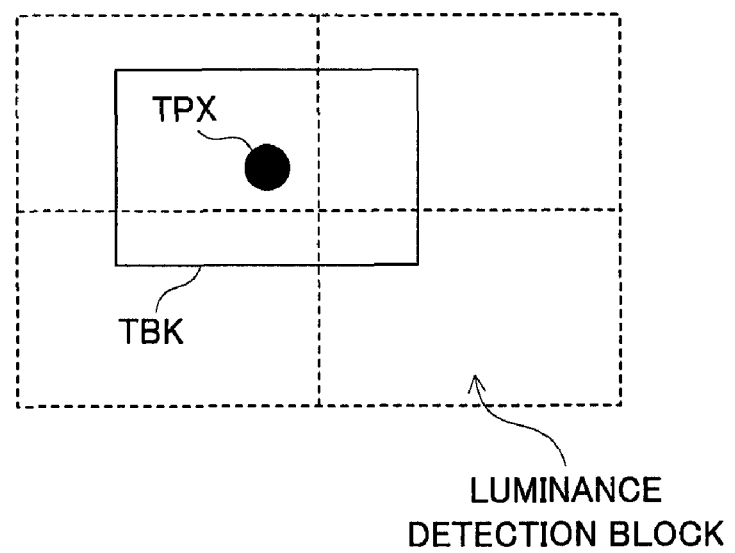
FIG. 9 is an illustrative view showing one portion of an operation of a linear interpolating circuit applied to the embodiment in FIG. 7.

The block-luminance calculating circuit 62 divides the imaging surface into 64 luminance detection blocks according to a procedure shown in FIG. 8, and calculates an average value of the Y data for each divided luminance detection block. A linear interpolating circuit 64 assumes a block TBK having the same size as that of the luminance detection block around a pixel inputted at this time, i.e., a current pixel JP) and performs linear interpolation on the average values calculated at the surrounding peripheral luminance detection blocks (see FIG. 9). As a result, the luminance average value in the assumed block TBK is outputted as a block average luminance AVEblk. Also, an entire-luminance calculating circuit 66 further averages the 64 average values calculated by the block-luminance calculating circuit 62, and outputs the average value obtained thereby as an entire average luminance AVEfrm.

The block average luminance AVEblk calculated by the linear interpolating circuit 64 is applied to the standard-deviation calculating circuit 54 and a modification gain calculating circuit 68. Also, the entire average luminance AVEfnm calculated by the entire-luminance calculating circuit 66 is applied to the standard-deviation calculating circuit 58 and the modification gain calculating circuit 68.

The standard-deviation calculating circuit 54 calculates, as a standard deviation σ1, a bias degree relative to the block average luminance AVEblk of the luminance of the current pixel TPX. A correction-coefficient calculating circuit 56 calculates or adjusts a correction coefficient K1 based on the standard deviation σ1 applied from the standard-deviation calculating circuit 54. The standard-deviation calculating circuit 58 calculates a bias degree, as a standard deviation σ2, relative to the entire-average luminance AVEfrm of the luminance of the current pixel TPX. A correction-coefficient calculating circuit 60 calculates or adjusts a correction coefficient K2 based on the standard deviation σ2 applied from the standard-deviation calculating circuit 58.

Herein, a calculation characteristic (adjustment characteristic) of the correction coefficient K1 by the correction-coefficient calculating circuit 56 and a calculation characteristic (adjustment characteristic) of the correction coefficient K2 by the correction-coefficient calculating circuit 60 are changed among settings A to D by the CPU 36, in view of whether there exists the face image of a person in the object scene image and whether the average luminance of the object scene image exceeds the reference value REF1.

The CPU 36 selects the setting A when there does not exist a person face in the object scene and the entire average luminance AVEfrm exceeds the reference value REF1, and selects the setting B when there exists the person face in the object scene and the entire average luminance AVEfrm exceeds the reference value REF1. Further, the CPU 36 selects the setting C when there exists the person face in the object scene and the entire average luminance AVEfrm is equal to or less than the reference value REF1, and selects the setting D when there does not exist the person face in the object scene and the entire average luminance AVEfrm is equal to or less than the reference value REF1.

Figure 10:
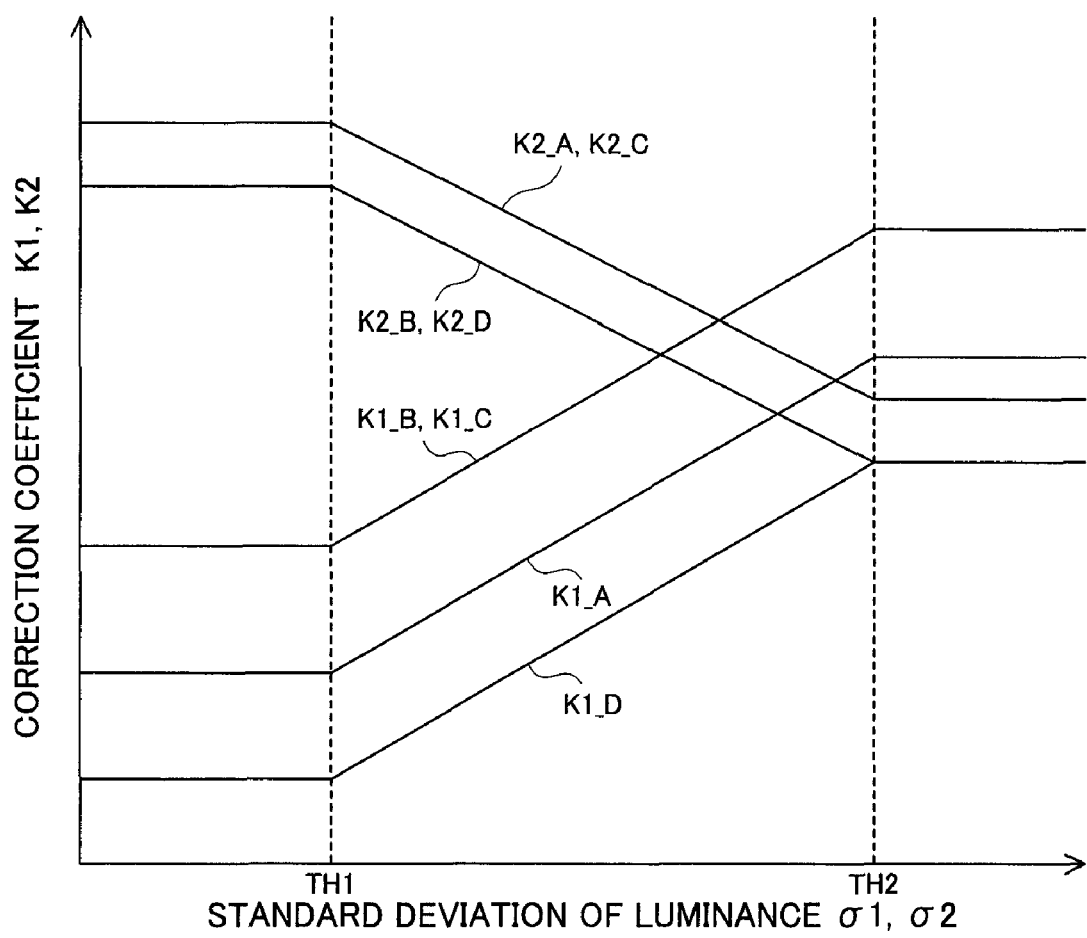
FIG. 10 is a graph showing one example of a change of a correction coefficient relative to a luminance standard deviation.

With reference to FIG. 10, the calculation characteristic of the correction coefficient K1 exhibits a characteristic along a straight line K1_A corresponding to the setting A, exhibits a characteristic along a straight line K1_B corresponding to the setting B, exhibits a characteristic along a straight line K1_C corresponding to the setting C, and exhibits a characteristic along a straight line K1_D corresponding to the setting D. Further, the calculation characteristic of the correction coefficient K2 exhibits a characteristic along a straight line K2_A corresponding to the setting A, exhibits a characteristic along a straight line K2_B corresponding to the setting B, exhibits a characteristic along a straight line K2_C corresponding to the setting C, and exhibits a characteristic along a straight line K2_D corresponding to the setting D.

The modification gain calculating circuit 68 refers to the correction coefficients K1 and K2 thus calculated, and performs an arithmetic operation according to Equation 1 on the block average luminance AVEblk and the entire average luminance AVEfnm.

$$PIX\_G = 2.0 - \Delta AVE * K1 - ((AVEfrm * K2), PIX\_UDR, PIX\_OVR) + GAIN\_OFST \quad [\text{Equation 1}]$$

PIX_G: correction gain
2.0: predetermined value
ΔAVE: AVEblk-AVEfrm
GAIN_OFST: offset
PIX_UDR: constant
PIX_OVR: constant that exceeds PIX_UDR According to the Equation 1, a multiplication value obtained by multiplying (weighting) a difference between the block average luminance AVEblk and the entire average luminance AVEfrm, by the correction coefficient K1, and a multiplication value obtained by multiplying (weighting) the entire average luminance AVEfrm by the correction coefficient K2 (it is noted that PIX_UDR is a lower limit value and PIX_OVR is an upper limit value) are subtracted from a predetermined value of "2.0", and offset GAIN_OFST is added to the subtraction value.

The value of the offset GAIN_OFST is also changed between the settings A to D by the CPU 36, in view of whether there exists the face image of a person in the object scene image and whether the average luminance of the object scene image exceeds the reference value REF1. The offset GAIN_OFST indicates "−0.125" corresponding to the setting A, indicates "−0.0625" corresponding to the setting B, indicates "0" corresponding to the setting C, and indicates "+0.0625" corresponding to the setting D.

The modification gain PIX_G thus calculated is applied to the γ-correction-amount modifying circuit 70. On the other hand, the γ-correction-amount calculating circuit 52 refers to a predetermined γ correction curve so as to calculate a γ correction amount corresponding to the Y data value of the current pixel TPX, and applies the calculated γ correction amount to the γ-correction-amount modifying circuit 70. The γ-correction-amount modifying circuit 70 multiples the γ correction amount applied from the γ-correction-amount calculating circuit 52, by the modification gain PIX_G applied from the modification gain calculating circuit 68, and applies to the Y correcting circuit 72 a modified γ-correction amount that is thereby obtained. The Y correcting circuit 72 refers to the applied modified γ correction amount so as to correct the Y data of the current pixel TPX, and outputs the corrected Y data toward the memory control circuit 24 (see FIG. 1) and applies the corrected Y data to the UV-correction-amount calculating circuit 74.

The UV-correction-amount calculating circuit 74 calculates a UV correction amount based on the applied corrected Y data. The UV correcting circuit 76 refers to the calculated UV correction amount so as to correct the UV data of the current pixel TPX, and outputs the corrected UV data toward the memory control circuit 24 (see FIG. 1).

Figure 11:
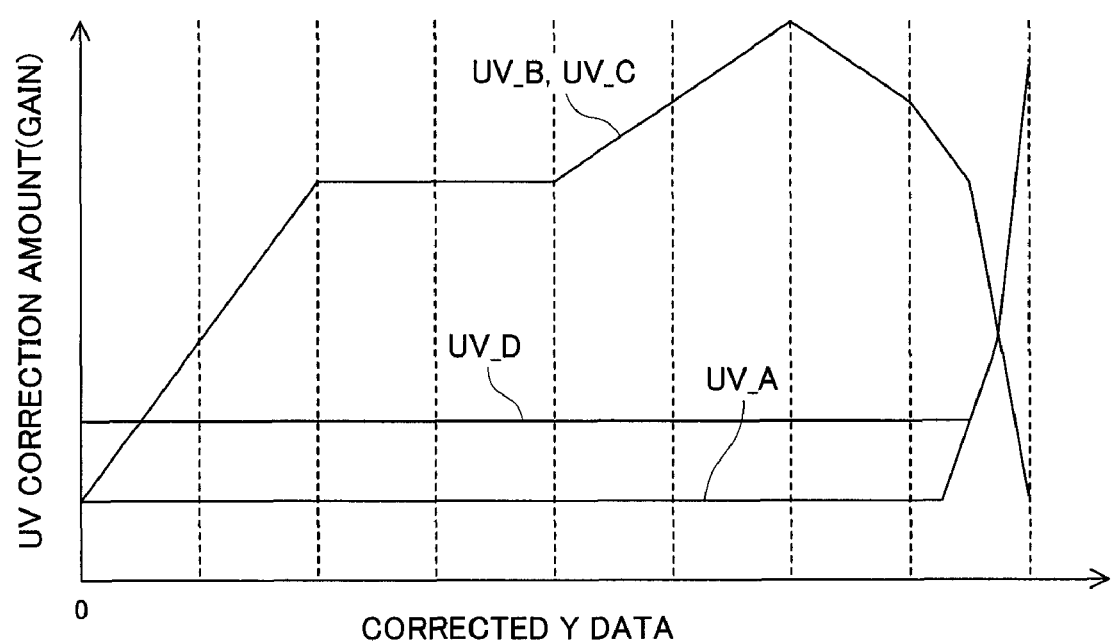
FIG. 11 is a graph showing one example of a change of a UV gain relative to corrected Y data.

The calculation characteristic of the UV correction amount is also changed between the settings A to D by the CPU 36, in view of whether there exists the face image of a person in the object scene image and whether the average luminance of the object scene image exceeds the reference value REF1. With reference to FIG. 11, the calculation characteristic of the UV correction amount exhibits a characteristic along a straight line UV_A corresponding to the setting A, exhibits a characteristic along a straight line UV_B corresponding to the setting B, exhibits a characteristic along a straight line UV_C corresponding to the setting C, and exhibits a characteristic along a straight line UV_D corresponding to the setting D.

Figure 12:
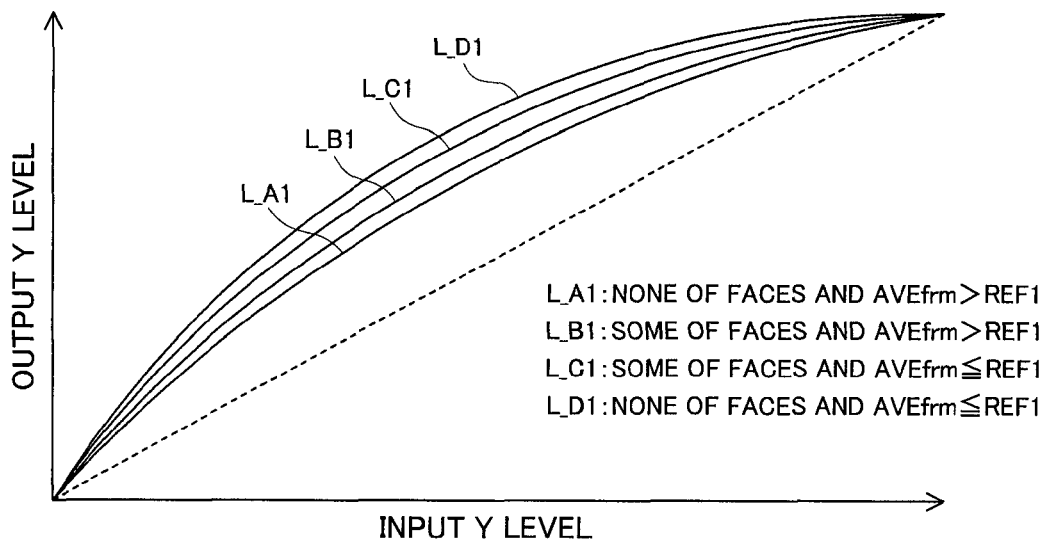
FIG. 12(A) is a graph showing one example of a correction characteristic of Y data.
FIG. 12(B) is a graph showing one example of a correction characteristic of UV data.
Figure 12:
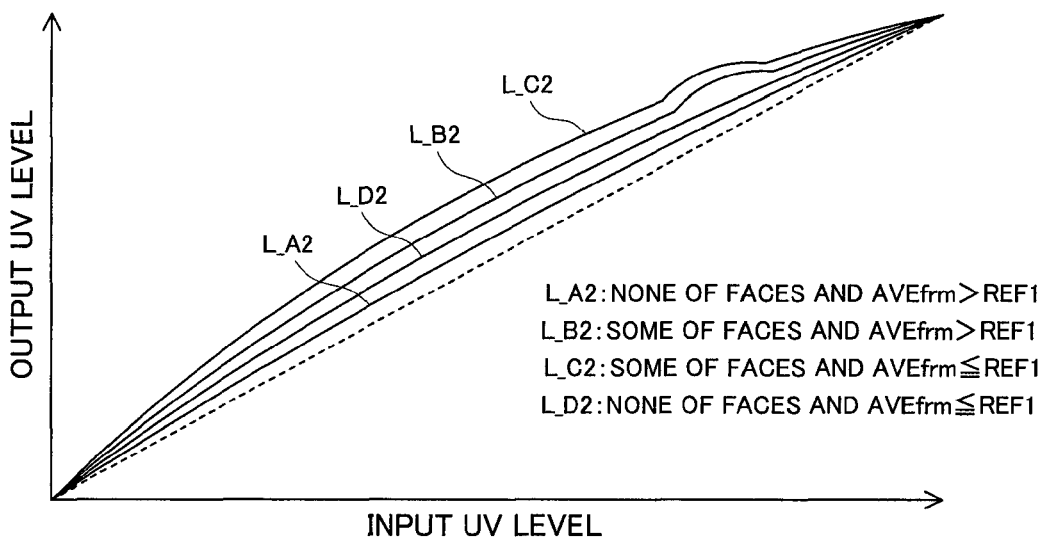

As a result, an input/output characteristic of the Y correcting circuit 72 is defined as shown in FIG. 12(A), and an input/output characteristic of the UV correcting circuit 76 is defined as shown in FIG. 12(B). That is, the Y data is corrected along a curve L_A1 corresponding to the setting A, is corrected along a curve L_B1 corresponding to the setting B, is corrected along a curve L_C1 corresponding to the setting C, and is corrected along a curve L_D1 corresponding to the setting D. Also, the w data is corrected along a curve L_A2 corresponding to the setting A, is corrected along a curve L_B2 corresponding to the setting B, is corrected along a curve L_C2 corresponding to the setting C, and is corrected along a curve L_D2 corresponding to the setting D.

When a landscape picture as shown in FIG. 6(A) is photographed, the setting A or D is selected. The correction coefficient K1 is adjusted along the straight line K1_A or K1_D shown in FIG. 10, and the correction coefficient K2 is adjusted along the straight line K2_A or K2_D shown in the same FIG. 10. Thus, a luminance of a contour portion of a building BLD1 or a bridge BRG1, i.e., a boundary portion in between with a sky, is inhibited, and a luminance of a center portion of the building BLD1 or the bridge BRG1 is increased. Also, the UV correction amount is adjusted along the straight line UV_A or UV_D shown in FIG. 11. Thus, a chroma of a low-luminance portion is contained to low, and a chroma of a high-luminance portion is increased. Thereby, a contrast of the landscape picture is corrected in a good condition.

On the other hand, when a person image as shown in FIG. 6(B) is photographed, the setting B or C is selected. The correction coefficient K1 is adjusted along a straight line K1_B or K1_C shown in FIG. 10, and the correction coefficient K2 is adjusted along a straight line K2_B or K2_C shown in the same FIG. 10. Therefore, the luminance of a contour portion of a face of a person H1 is more greatly inhibited, and the luminance of a center portion of the face of the person H1 is increased. Also, the UV correction amount is adjusted along the straight line UV_B or UV_C shown in FIG. 11. Therefore, the chroma in a medium-luminance portion is increased and the chroma in a high luminance portion and a low luminance portion is inhibited. Thereby, the contrast of the person image is corrected in good condition.

Figure 13:
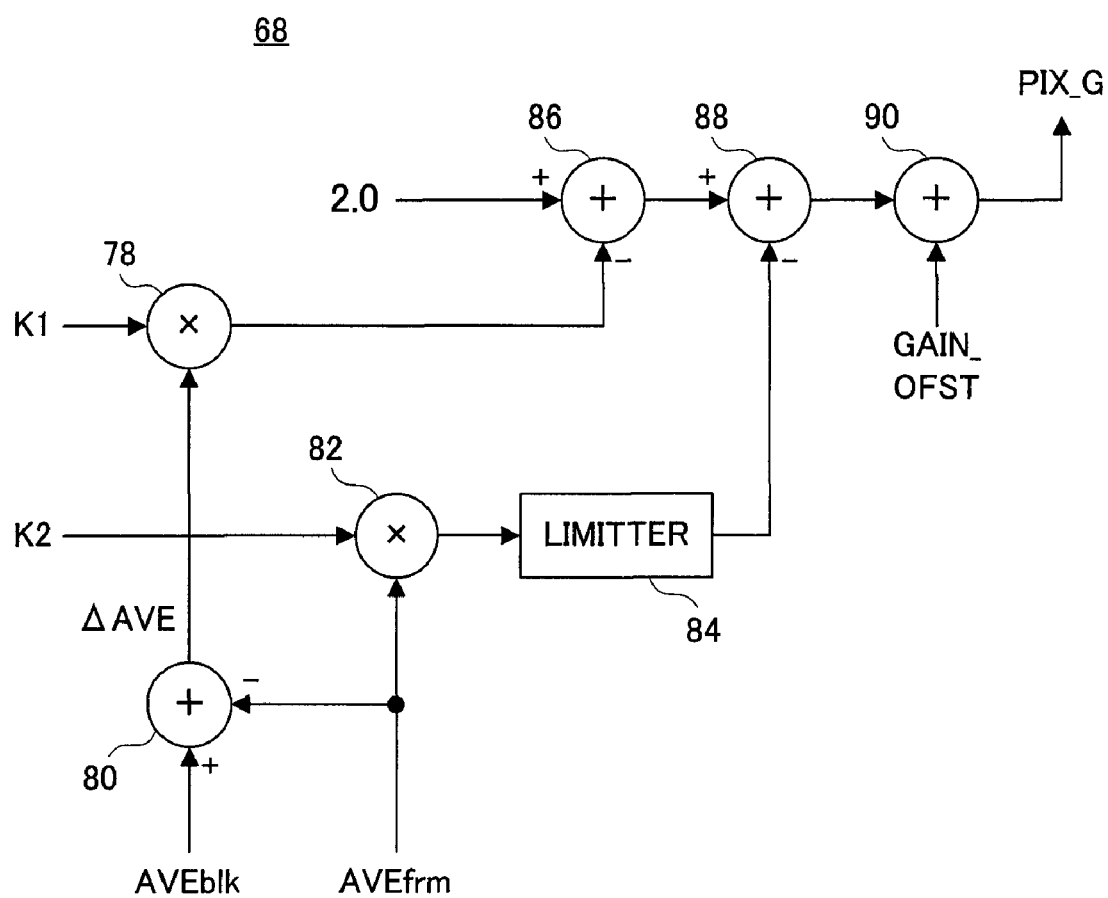
FIG. 13 is a block diagram showing one example of a configuration of a modification gain calculating circuit applied to the embodiment in FIG. 7.

The modification gain calculating circuit 68 is configured as shown in FIG. 13. The correction coefficients K1 and K2 are applied to one input terminal of a multiplier 78 and to one input terminal of a multiplier 82. An adder 80 subtracts the entire average luminance AVEfrm from the block average luminance AVEblk, and applies a subtraction value ΔAVE obtained thereby to the other input terminal of the multiplier 78. The entire average luminance AVEfrm is also applied to the other input terminal of the multiplier 82.

The multiplier 78 multiplies a difference value ΔAVE by the correction coefficient K1, and applies a multiplication value thus obtained to the one input terminal of the adder 86. The multiplier 82 multiplies the entire average luminance AVEfrm by the correction coefficient K2, and inputs a multiplication value thus obtained into a limitter 84. The limitter 84 applies the inputted multiplication value to the one input terminal of the adder 88 when the multiplication value is equal to or more than a constant PIX_UDR and equal to or less than PIX_OVR. Also, the limitter 84 applies the constant PIX_UDR to the one input terminal of the adder 88 when the inputted multiplication value falls below the constant PIX_UDR, and applies the constant PIX_OVR to the one input terminal of the adder 88 when the inputted multiplication value exceeds the constant PIX_OVR.

The other input terminal of the adder 86 is applied a predetermined value of "2.0". The adder 86 subtracts output of the multiplier value 78 from the predetermined value "2.0", and applies the subtraction value to the other input terminal of the adder 88. The adder 88 subtracts output of the limitter 84 from this subtraction value, and applies the subtraction value to the one input terminal of the adder 90. The adder 90 adds the offset GAIN_OFST applied to the other input terminal, to the subtraction value applied to the one input terminal, and outputs the added value as the modification gain PIX_G.

Figure 16:
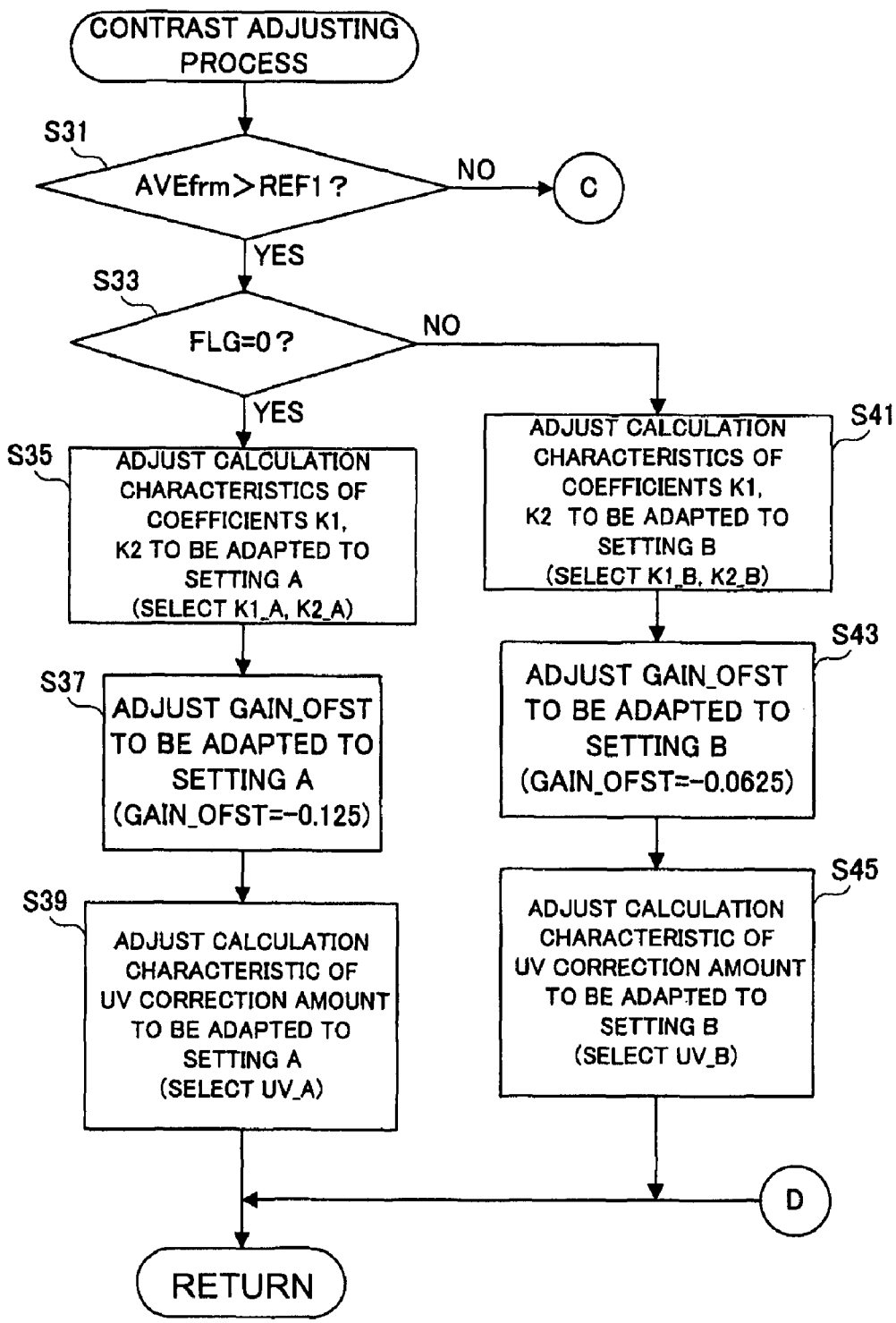
FIG. 16 is a flowchart showing still another portion of the operation of the CPU applied to the embodiment in FIG. 1.
Figure 17:
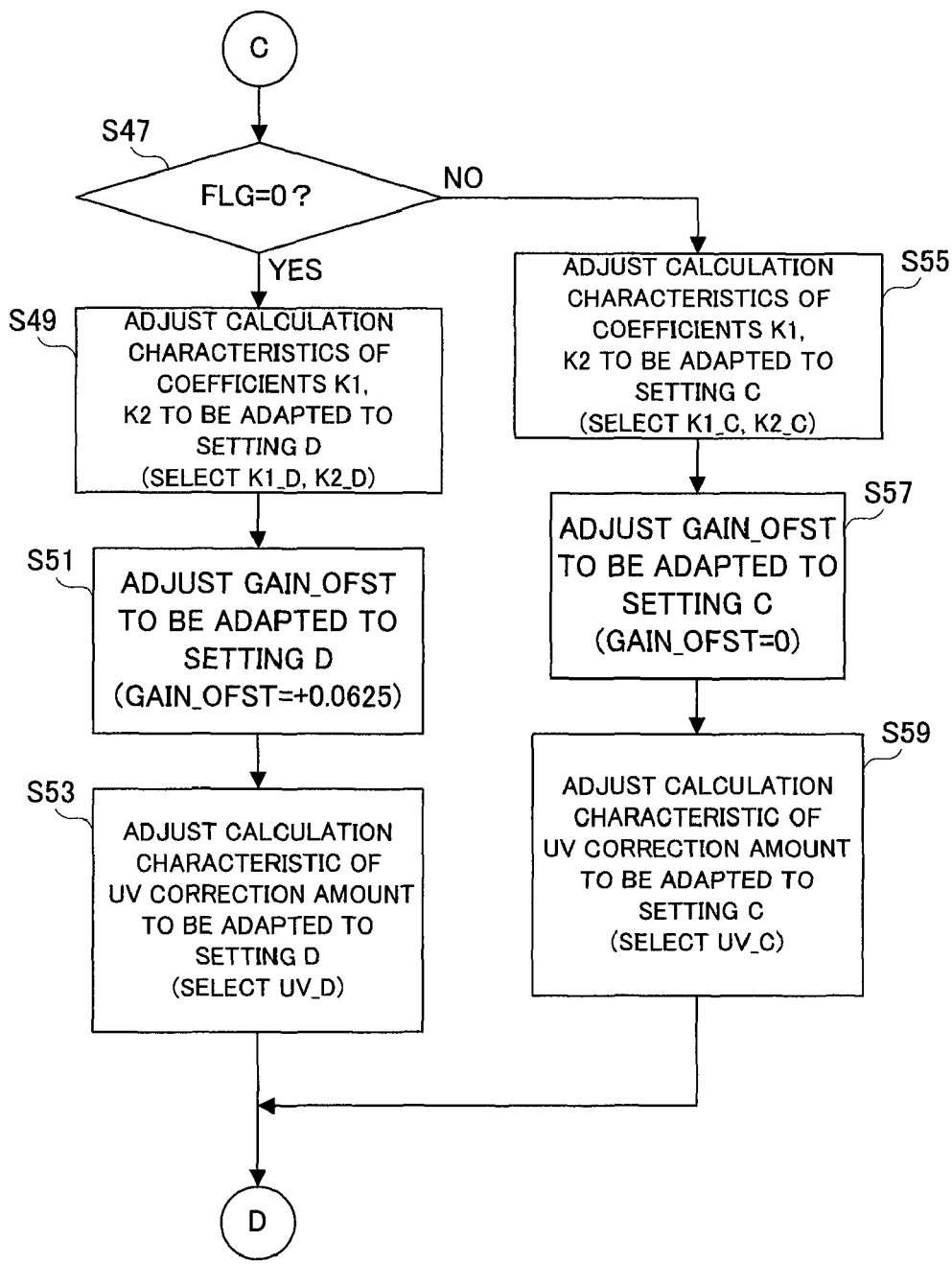
FIG. 17 is a flowchart showing yet still another portion of the operation of the CPU applied to the embodiment in FIG. 1.
Figure 18:
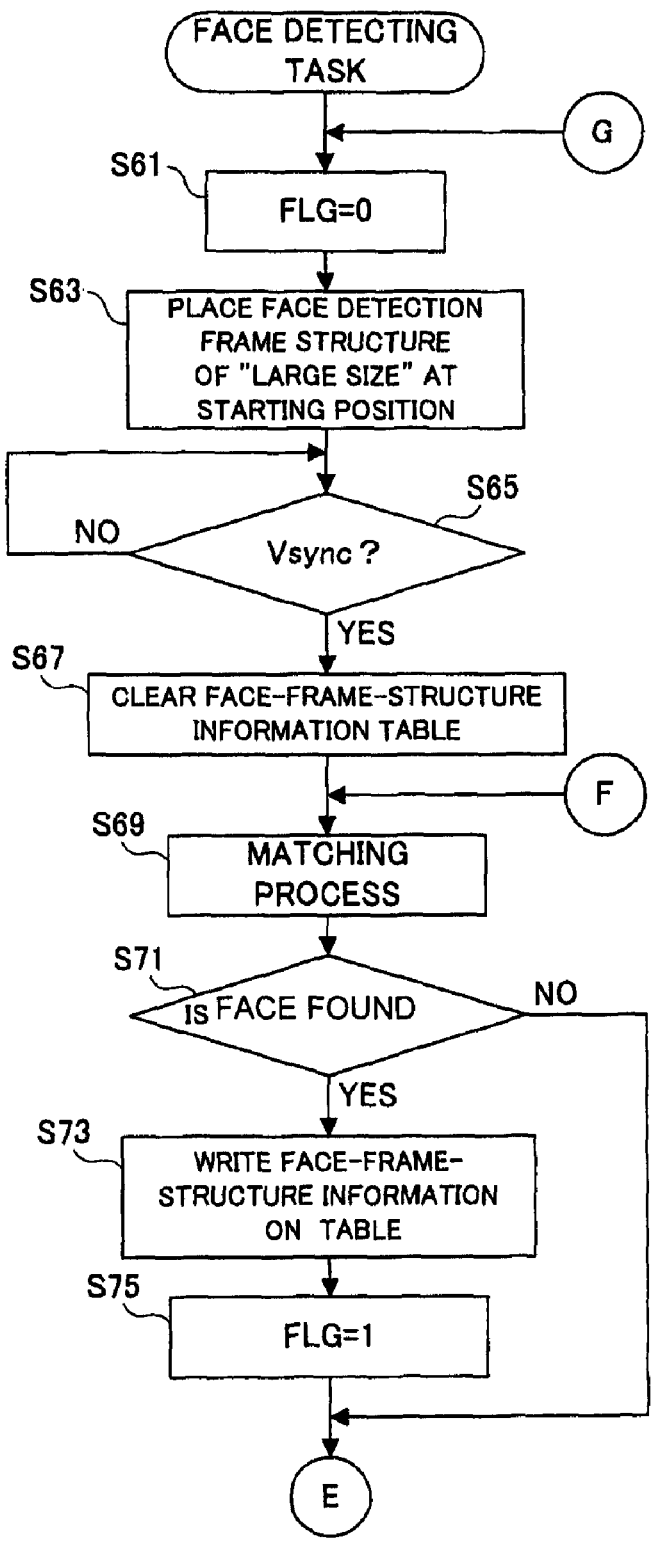
FIG. 18 is a flowchart showing another portion of the operation of the CPU applied to the embodiment in FIG. 1.
Figure 19:
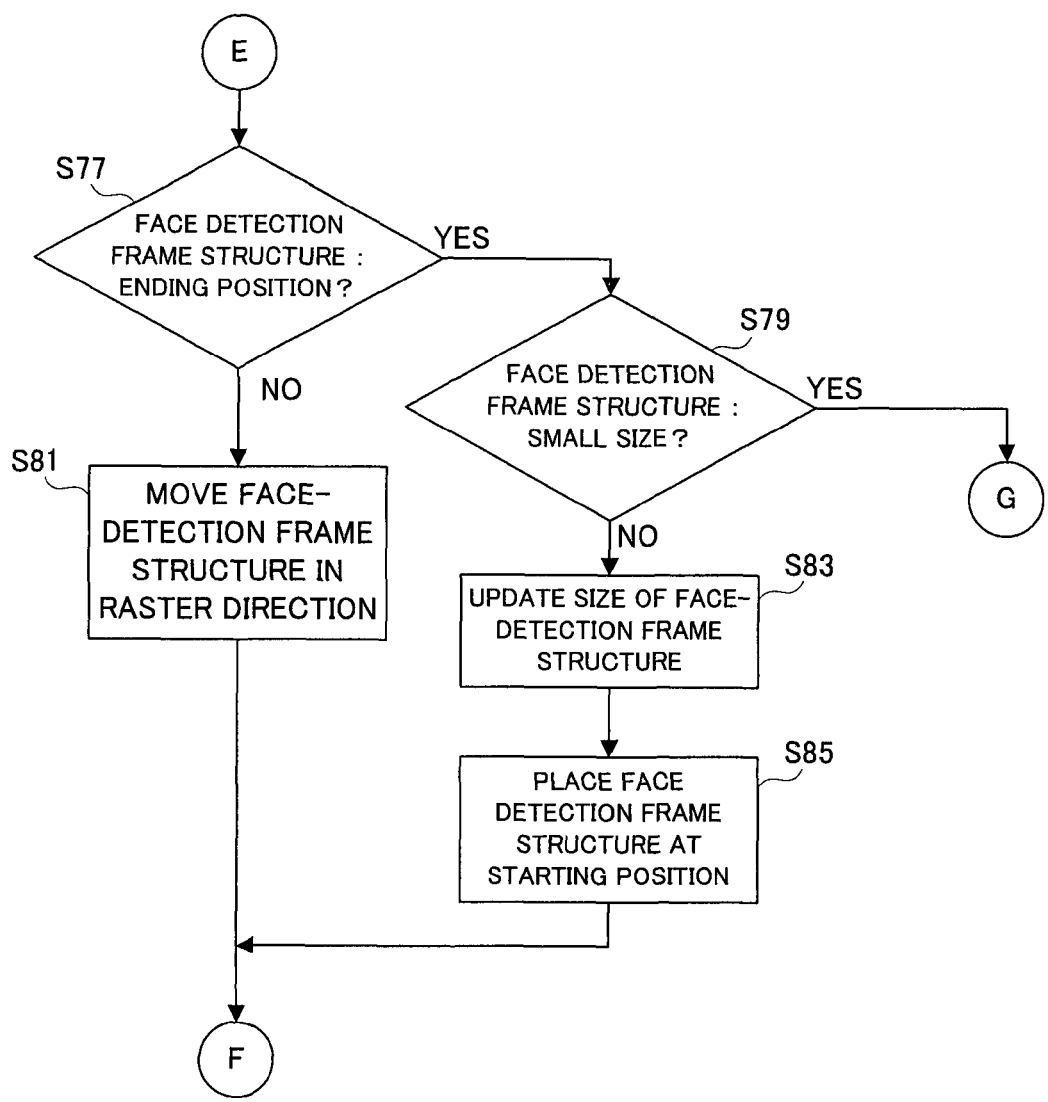
FIG. 19 is a flowchart showing still another portion of the operation of the CPU applied to the embodiment in FIG. 1.

The CPU 36 concurrently executes a plurality of tasks including an imaging task shown in FIG. 14 to FIG. 17, and a face detecting task shown in FIG. 18 and FIG. 19. It is noted that control programs corresponding to these task are stored in the flash memory 44.

Figure 14:
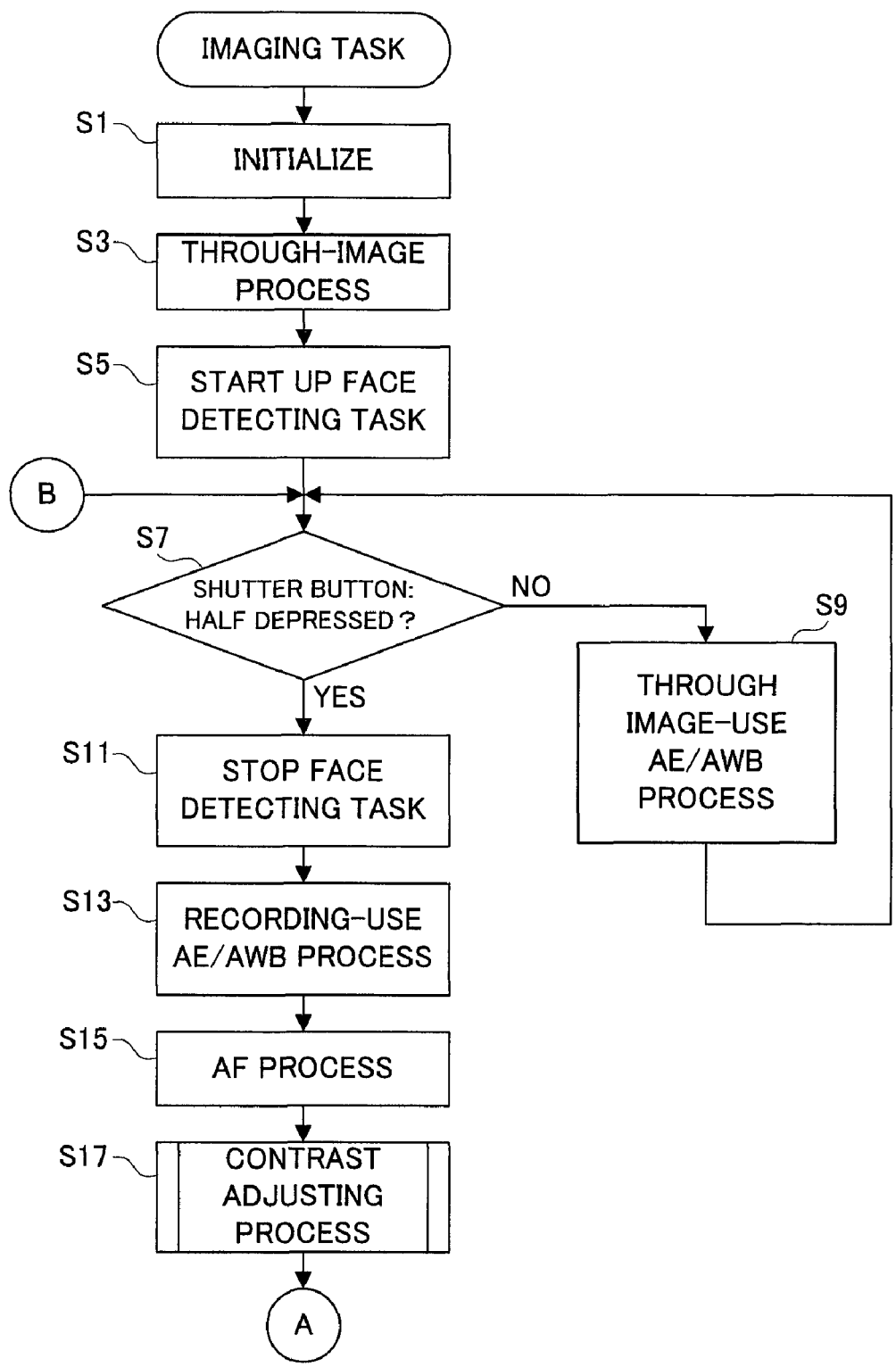
FIG. 14 is a flowchart showing one portion of an operation of a CPU applied to the embodiment in FIG. 1.
Figure 15:
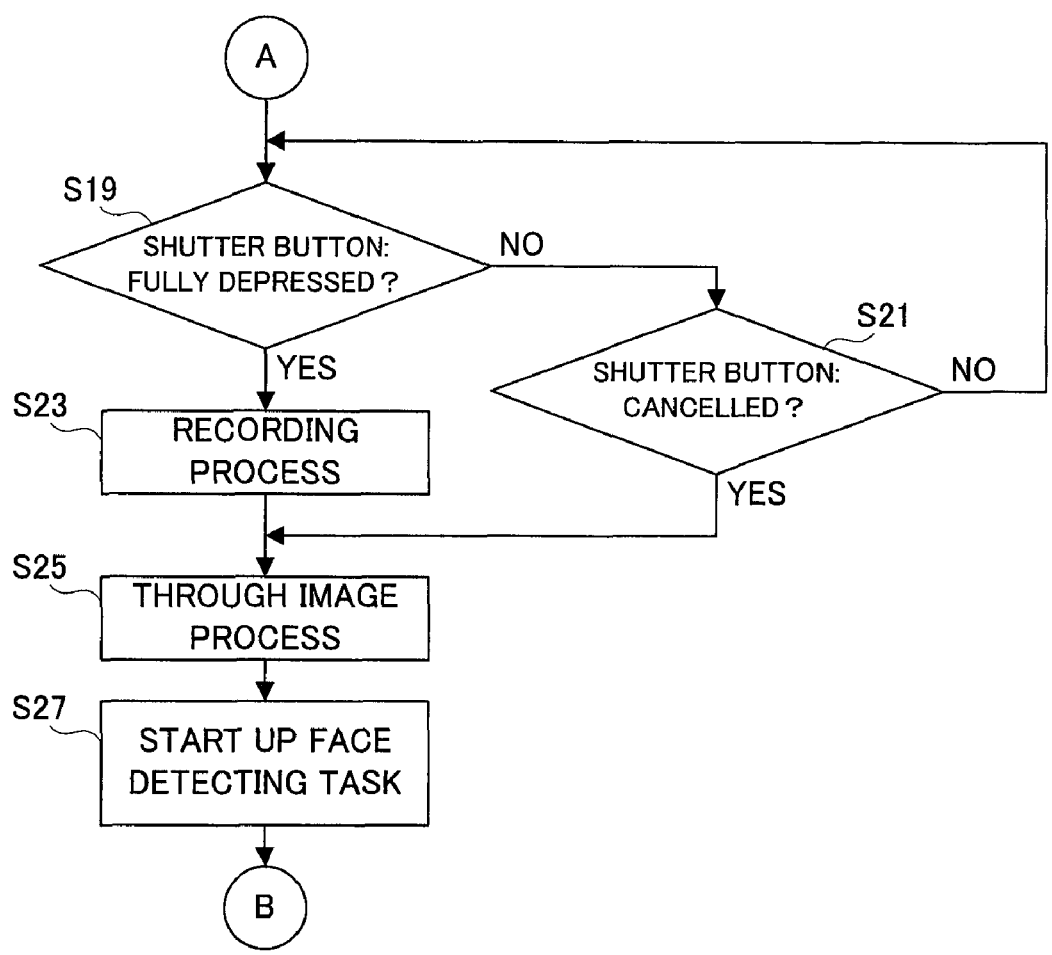
FIG. 15 is a flowchart showing another portion of the operation of the CPU applied to the embodiment in FIG. 1.

With reference to FIG. 14, an initializing process is executed in a step S1. As a result, the calculation characteristics of the coefficients K1 and K2 and the calculation characteristics of the offset GAIN_OFST and the UV correction amount are adjusted to be adapted to the setting A. In a step S3, the through-image process is executed, and in a following step S5, the face detecting task is started up. As a result of the process in the step S3, the through image that represents an object scene is outputted from the LCD monitor 38. Also, as a result of the process in the step S5, a process of the face detecting task shown in FIG. 18 and FIG. 19 is started.

In a step S7, it is determined whether or not the shutter button 38s is half-depressed, and as long as the determination result indicates NO, the through image-use AE/AWB process in a step S9 is repeated. As a result, the brightness and the white balance of the through image are adjusted moderately. When the shutter button 38s is half-depressed, the face detecting task is stopped in a step S11. In a step S13, the recording-use AE/AWB process is executed, in a step S15, the AF process is executed, and then, in a step S17, the contrast adjusting process is executed.

As a result of the process in the step S11, the process of the face detecting task is stopped, and as a result of the process in the step S13, the brightness of the through image is adjusted to the optimal value. Moreover, as a result of the process in the step S15, the focus lens 12 is placed onto the focal point, and as a result of the process in the step S17, the contrast of the through image is adjusted in a manner to suit the attribute of the object scene.

In a step S19, it is determined whether or not the shutter button 38s is fully depressed, and in a step S21, it is determined whether or not a manipulation of the shutter button 38s is cancelled. When YES is determined in the step S19, the process proceeds to a step S25 after undergoing a recording process in a step S23, and when YES is determined in a step S21, the process directly proceeds to the step S25. In the step S25, a process similar to that in the step S3 is executed, and in a step S27, a process similar to that in the step S5 is executed. Upon completion of the process in the step S27, the process returns to the step S5.

The contrast adjusting process in the step S17 shown in FIG. 14 follows a subroutine shown in FIG. 16 and FIG. 17.

Firstly, in a step S31, it is determined whether or not the average value AVEfrm exceeds the reference value REF1, and in each of steps S33 and S47, it is determined whether or not the flag FLG is "0". It is noted that the flag FLG is updated from "0" to "1" when the face image of a person is detected from the object scene image by the face detecting task.

When YES is determined in each of the steps S31 and S33, processes in steps S35 to S39 are executed. When YES is determined in the step S31 while NO is determined in the step S33, processes in steps S41 to S45 are executed. When NO is determined in the step S31 while YES is determined in the step S47, processes in steps S49 to S53 are executed. When NO is determined in each of the steps S31 and S47, processes in steps S55 to S59 are executed. Upon completion of the process in the step S39, S45, S53, or S59, the process is returned to the routine of the upper hierarchical level.

In the step S35, the calculation characteristics of the coefficients K1 and K2 are adjusted to be adapted to the setting A, in the step S37, the offset GAIN_OFST is adjusted to be adapted to the setting A, and in the step S39, the calculation characteristic of the UV correction amount is adjusted to be adapted to the setting A. In the step S41, the calculation characteristics of the coefficients K1 and K2 are adjusted to be adapted to the setting B, in the step S43, the offset GAIN_OFST is adjusted to be adapted to the setting B, and in the step S45, the calculation characteristic of the UV correction amount is adjusted to be adapted to the setting B.

In the step S49, the calculation characteristics of the coefficients K1 and K2 are adjusted to be adapted to the setting D, in the step S51, the offset GAIN_OFST is adjusted to be adapted to the setting D, and in the step S53, the calculation characteristic of the UV correction amount is adjusted to be adapted to the setting D. In the step S55, the calculation characteristics of the coefficients K1 and K2 are adjusted to be adapted to the setting C, in the step S57, the offset GAIN_OFST is adjusted to be adapted to the setting C, and in the step S59, the calculation characteristic of the UV correction amount is adjusted to be adapted to the setting C.

With reference to FIG. 18 and FIG. 19, the flag FLG is set to "0" in a step S61, and in a following step S63, the face detection area of "large size" is placed at the face-detection starting position at the upper left of the evaluation area EVA.

In a step S65, it is determined whether or not the vertical synchronization signal Vsync is generated, and when YES is determined, the face-frame-structure information table TBL is cleared in a step S67. In a step S69, the matching process for the face recognition is executed, and in a step S71, it is determined whether or not the face of a person is discovered. When it is determined by the matching process that the image belonging to the face-detection frame structure is equivalent to the face image of a person, YES is determined in the step S71, the process proceeds to a step S77 after undergoing processes in steps S73 to S75. On the other hand, when it is determined by the matching process that the image belonging to the face-detection frame structure differs from the face image, NO is determined in the step S71, and the process directly proceeds to the step S77.

In the step S73, the face-frame-structure information written with the position and the size of the face-detection frame structure at this time point is created, and the created face-frame-structure information is written on the face-frame-structure information table TBL. In the step S75, the flag FLG is set to "1" in order to declare that the face image is discovered.

In the step S77, it is determined whether or not the face-detection frame structure reaches the face-detection ending position at the lower right of the evaluation area EVA. In a step S79, it is determined whether or not the size of the face-detection frame structure is a small size. When NO is determined in the step S77, the process proceeds to the step S81 so as to move the face-detection frame structure in a raster direction by a predetermined amount. Upon completion of the moving process, the process returns to the step S69.

When YES is determined in the step S77 while NO is determined in the step S79, the size of the face-detection frame structure is updated in a step S83. When the size at this time point of the face-detection frame structure is the large size, the updated size is the medium size, and when the size at this time point of the face-detection frame structure is the medium size, the updated size is the small size. In a step S85, the face-detection frame structure is placed at the face-detection staring position, and upon completion of the placing process, the process returns to the step S69. It is noted that when YES is determined in the both steps S77 and S79, the process returns to the step S61 to prepare for a face detecting process for a next frame, regarding that the face detecting process on the current frame is ended.

As understood from the above-described description, the standard-deviation calculating circuits 54 and 58 calculate the deviations σ1 and σ2 (bias degrees) of each luminance of a plurality of pixels forming an input image by referring to the average luminance of the input image. The correction-coefficient calculating circuit 56 adjusts the correction coefficient K1 based on the deviation σ1 calculated by the standard deviation calculating circuit 54. The correction-coefficient calculating circuit 60 adjusts the correction coefficient K2 based on the deviation σ2 calculated by the standard-deviation calculating circuit 58.

The Y correcting circuit 72 corrects each luminance of a plurality of pixels forming the input image by referring to the correction coefficients K1 and K2 thus adjusted. The CPU 36 determines an input-image-attribute including the presence/absence of the face image of a person (predetermined feature image) so as to change the adjustment characteristics of the correction coefficients K1 and K2 (S35, S41, S49, and S55).

That is, the correction coefficients K1 and K2 referred to for the correcting process of the Y correcting circuit 72 are adjusted based on the bias degree of the luminance of each pixel forming the input image. However, the adjustment characteristics of the correction coefficients K1 and K2 are changed by determining the input-image-attribute including the presence/absence of the face image of a person.

Therefore, when the bias of the luminance results from the contour of an image different from the face image of a person, the correction coefficients K1 and K2 are adjusted according to one adjustment characteristic. On the other hand, when the bias of the luminance results from the contour of the face image of a person, the correction coefficients K1 and K2 are adjusted according to another adjustment characteristic. In this manner, adaptive image quality control in which the input-image-attribute is considered is realized.

It is noted that in this embodiment, a still camera for photographing a still image is assumed. However, the present invention is also applicable to a video camera.

Moreover, in this embodiment, the face image of a person is assumed as the predetermined feature image. However, the predetermined feature image is not limited to this.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
a bias degree calculator which calculates a bias degree of each luminance of a plurality of pixels forming an input image by referring to an average luminance of the input image;
a luminance corrector which corrects each luminance of the plurality of pixels forming the input image based on the bias degree calculated by said bias degree calculator;
a searcher which searches for a partial image representing a specific object from the input image; and
a luminance setting adjuster which adjusts a setting of said luminance corrector so that a characteristic for correcting a luminance of a contour portion of an object appeared on the input image is different depending on a search result of said searcher, the image processing apparatus further comprising:
a color corrector which corrects each color of the plurality of pixels forming the input image by referring to a luminance corrected by said luminance corrector; and
a color setting adjuster which adjusts a setting of said color corrector so that a characteristic for correcting a color is different depending on the search result of said searcher, wherein said color setting adjuster includes a first color characteristic setter which sets the correction characteristic of said color corrector to a first color characteristic corresponding to detection of said searcher, and a second color characteristic setter which sets the correction characteristic of said color corrector to a second color characteristic corresponding to non-detection of said searcher;

said first color characteristic is equivalent to a characteristic in which a chroma in a high luminance portion and/or a low luminance portion is inhibited and the chroma in a medium-luminance portion is increased, and said second color characteristic is equivalent to a characteristic in which the chroma of the low-luminance portion is inhibited and the chroma of the high-luminance portion is increased.

2. The image processing apparatus according to claim 1, wherein said luminance setting adjuster includes a first luminance characteristic setter which sets the correction characteristic of said luminance corrector to a first luminance characteristic corresponding to detection of said searcher; and a second luminance characteristic setter which sets the correction characteristic of said luminance corrector to a second luminance characteristic corresponding to non-detection of said searcher.

3. The image processing apparatus according to claim 1, further comprising a holder which holds a dictionary image equivalent to the specific object, wherein said searcher searches for the partial image with reference to the dictionary image held by said holder.

4. An image processing apparatus, comprising:
a bias degree calculator which calculates a bias degree of each luminance of a plurality of pixels forming an input image by referring to an average luminance of the input image;
a luminance corrector which corrects each luminance of the plurality of pixels forming the input image based on the bias degree calculated by said bias degree calculator;
a searcher which searches for a partial image representing a specific object from the input image; and
a luminance setting adjuster which adjusts a setting of said luminance corrector so that a characteristic for correcting a luminance of a contour portion of an object appeared on the input image is different depending on a search result of said searcher, the image processing apparatus,
a first average-luminance calculator which calculates a first average luminance equivalent to an average luminance of the input image for each first block having a first size; and
a second average-luminance calculator which calculates a second average luminance equivalent to an average luminance of the input image for each second block having a second size larger than the first size, wherein said bias degree calculator includes a first bias-degree calculator which calculates a first bias degree equivalent to a bias degree for the first average luminance and a second bias-degree calculator which calculates a second bias degree equivalent to a bias degree for the second average luminance,
wherein said luminance corrector includes a first coefficient adjustor which adjusts a first correction coefficient based on the first bias degree, a second coefficient adjustor which adjusts a second correction coefficient based on the second bias degree, and an arithmetic processor which performs an arithmetic process on the first average luminance and the second average luminance by referring to the first correction coefficient and the second correction coefficient, and said luminance setting adjuster includes an adjustment characteristic changer which changes adjustment characteristics of said first coefficient adjustor and said second coefficient adjustor.

5. The image processing apparatus according to claim 4, wherein said arithmetic processor includes a block bias degree calculator which calculates a block bias degree equivalent to a bias degree of the first average luminance for the second average luminance, and a weighter which weights the block bias degree by referring to the first correction coefficient.

6. The image processing apparatus according to claim 4, wherein said luminance corrector includes an adder which adds an offset, and said luminance setting adjuster includes an offset changer which changes a magnitude of the offset.

7. The image processing apparatus according to claim 4, wherein said luminance corrector further includes: a gamma-correction-amount outputter which outputs a gamma correction amount corresponding to each of the plurality of pixels forming the input image; and a modifier which modifies the gamma correction amount outputted by said gamma-correction-amount outputter by referring to an arithmetic operation result of said arithmetic processor.

* * * * *